United States Patent
Ash (10) Patent No.: US 7,512,547 B2
(45) Date of Patent: Mar. 31, 2009

(54) FINANCIAL TRANSACTION APPROVAL SYSTEM AND METHOD

(75) Inventor: Robert W. Ash, Andover, MN (US)

(73) Assignee: Target Brands, Inc., Minneapolis, MN (US)

( * ) Notice: Subject to any disclaimer, the term of this patent is extended or adjusted under 35 U.S.C. 154(b) by 76 days.

(21) Appl. No.: 10/942,742

(22) Filed: Sep. 16, 2004

(65) Prior Publication Data
US 2006/0059108 A1 Mar. 16, 2006

(51) Int. Cl.
*G06F 17/60* (2006.01)

(52) U.S. Cl. .............. 705/16; 705/1; 705/64

(58) Field of Classification Search ............ 705/16, 705/1, 64
See application file for complete search history.

(56) References Cited

U.S. PATENT DOCUMENTS

| | | | |
|---|---|---|---|
| 5,357,563 A | | 10/1994 | Hamilton et al. |
| 5,448,044 A | | 9/1995 | Price et al. |
| 5,479,530 A | | 12/1995 | Nair et al. |
| 5,850,077 A | | 12/1998 | Tognazzini |
| 5,956,700 A | * | 9/1999 | Landry ............... 705/40 |
| 6,138,107 A | * | 10/2000 | Elgamal ............. 705/39 |
| 6,512,840 B1 | | 1/2003 | Tognazzini |
| 6,539,363 B1 | | 3/2003 | Allgeier et al. |
| 6,675,153 B1 | | 1/2004 | Cook et al. |
| 2002/0153414 A1 | | 10/2002 | Stoutenburg et al. |
| 2002/0169719 A1 | * | 11/2002 | Dively et al. ............ 705/40 |
| 2002/0170782 A1 | | 11/2002 | Millikan |
| 2002/0186144 A1 | * | 12/2002 | Meunier ............ 340/825.28 |
| 2005/0159988 A1 | * | 7/2005 | Ramseyer ............ 705/5 |
| 2005/0246193 A1 | * | 11/2005 | Roever et al. ............ 705/1 |

FOREIGN PATENT DOCUMENTS

JP 2000250993 A * 9/2000

OTHER PUBLICATIONS

"1st National Process: The Future of Electronic Merchant Processing," http://www.1nbcard.com/, pp. 1-12.

* cited by examiner

*Primary Examiner*—Pierre E Elisca
(74) *Attorney, Agent, or Firm*—Griffiths & Seaton PLLC (57) ABSTRACT

A method of sale including processing a plurality of purchases to be sold to a consumer, identifying a consumer financial account held by a financial institution, receiving authorization from the financial institution to enable payment for the plurality of purchases from the consumer financial account, and providing the consumer with an option to approve the payment from the consumer financial account. The option is provided during processing of the plurality of purchases. Transaction approval systems provide additional advantages.

18 Claims, 6 Drawing Sheets

FINANCIAL TRANSACTION APPROVAL SYSTEM AND METHOD

BACKGROUND OF THE INVENTION

Payments for goods and services with data cards, such as credit cards and debit cards, has become increasingly popular in recent years due in part to the ease and speed of performing data card transactions. For example, in retail settings, goods and/or services to be purchased are first entered into a cash register or point-of-sale terminal to determine their total cost. Once the total cost is determined, a consumer or a retail establishment associate swipes the consumer's data card to access consumer financial account information linked to the data card. The consumer provides approval, typically by providing a signature, thereby confirming intent to authorize payment from the consumer financial account for the goods. Following approval, funds are transferred from the consumer financial account to a financial account associated with the retail establishment. Although faster than traditional payment methods, such as payment by check, the time needed to swipe the data card and to approve the transaction contributes to the overall time each consumer spends in the checkout line waiting to purchase goods.

SUMMARY OF THE INVENTION

One aspect of the present invention relates to a method of sale. The method of sale includes processing a plurality of purchases to be sold to a consumer, identifying a consumer financial account held by a financial institution, receiving authorization from the financial institution to enable payment for the plurality of purchases from the consumer financial account, and providing the consumer with an option to approve the payment from the consumer financial account. The option is provided during processing of the plurality of purchases. Other features and advantages are also disclosed.

BRIEF DESCRIPTION OF THE DRAWINGS

Embodiments of the invention will be described with respect to the figures, in which like reference numerals denote like elements, and in which.

DETAILED DESCRIPTION

A process and system for approving and confirming financial card transactions, according to embodiments of the present invention, decrease overall consumer time spent in checkout lines. Decreasing the overall time each consumer spends in the checkout line provides a more attractive shopping environment and experience, increases overall efficiency of the retail establishment, decreases the labor necessary to handle consumer purchases, and improves the bottom line of the retail establishment or other entity from which goods and services are purchased.

Figure 1:
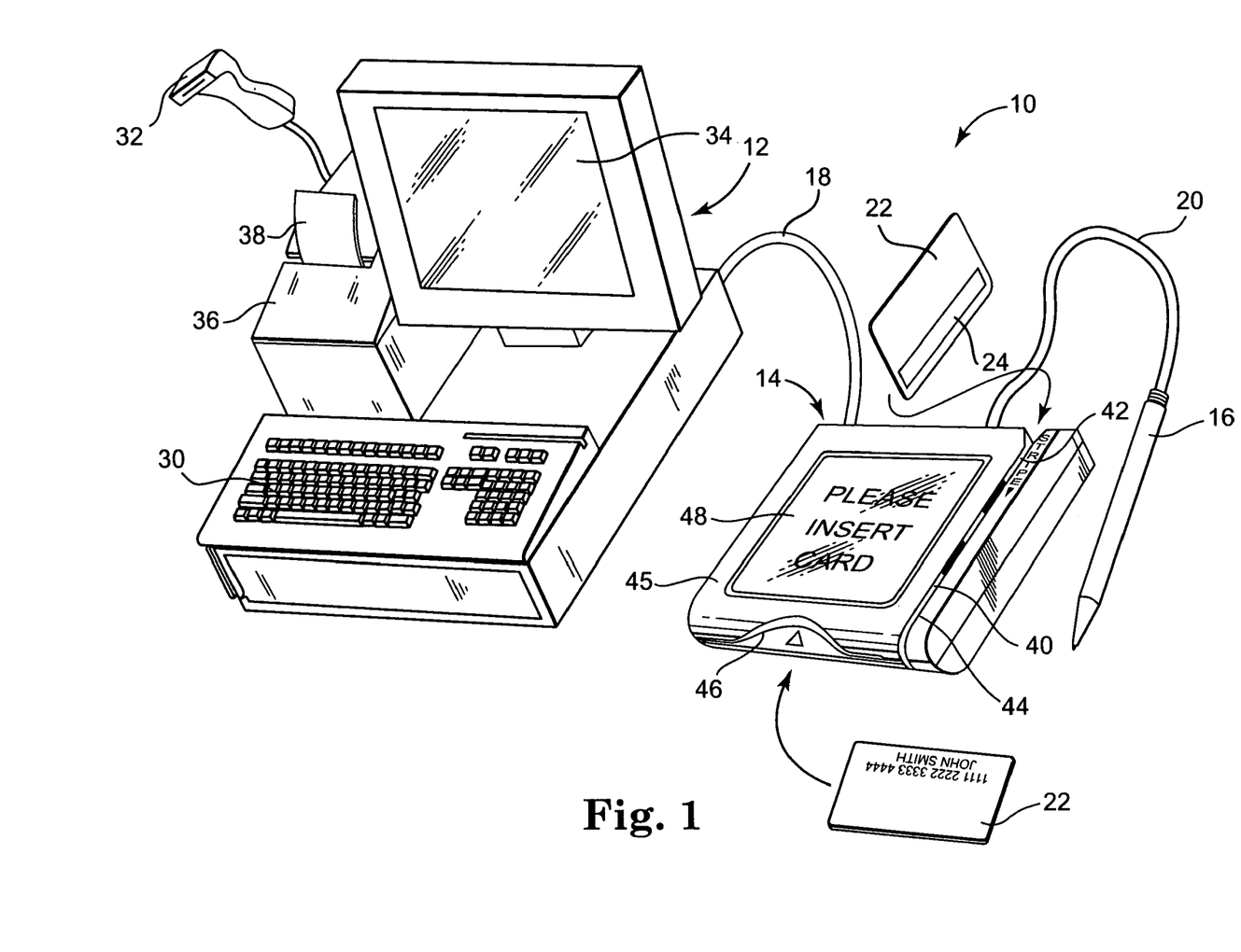
FIG. 1 is a perspective view illustrating one embodiment of a transaction approval system, according to the present invention.

FIG. 1 illustrates one embodiment of a transaction approval system 10 including a cash register or point-of-sale terminal 12, a financial transaction terminal 14, and a stylus 16. In one embodiment, point-of-sale terminal 12 is electrically coupled with financial transaction terminal 14 via a cord 18 or wireless connection, and stylus 16 is coupled with financial transaction terminal 14 via a cord 20. Alternatively, stylus 16 is not mechanically coupled with financial transaction terminal 14. Purchases by a consumer are processed or entered into point-of-sale terminal 12 to arrive at a total cost to be charged to the consumer for the entered purchases. Purchases include goods and/or services being sold to the consumer.

Financial transaction terminal 14 is configured to receive a financial transaction card 22 to access a related consumer financial account or source of funding and to charge the total cost of the purchases to the financial account by way of financial transaction card 22. Financial transaction card 22 is one of a credit card, a debit card, or a stored-value card such as a gift card, to name several examples. Stylus 16 allows a user to enter a user signature and/or other confirmation indicator into financial transaction terminal 14, to approve or confirm the transfer of funds from the financial account to complete the purchase and ultimately perform the associated financial transaction or withdrawal.

Point-of-sale terminal 12 includes a keyboard 30, a scanner 32, a monitor 34, and a printer 36. Item barcodes or other product information can be entered into point-of-sale terminal 12 via keyboard 30 or scanner 32, which, in one embodiment, is capable of reading UPC or bar codes off of the purchases. Alternatively, point-of-sale terminal 12 includes a radio frequency identification (RFID) device capable of reading and/or registering cost data and other purchase data. The information entered into point-of-sale terminal 12 can be viewed by a worker or associate of the retail establishment and/or a consumer via monitor 34. Finally, upon completion of the financial transaction or upon each addition of a new purchase or item to the point-of-sale terminal 12, printer 36 prints transaction details to a receipt 38 including a list of the purchases processed as well as the cash or amounts charged to the consumer's financial account to pay for the registered purchases. In one embodiment, receipt 38 includes a printout of a digitally captured signature, as will be further described below.

Financial transaction terminal 14 is a financial transaction card reader in communication with at least one financial institution network. As such, in one embodiment, financial transaction terminal 14 includes a financial transaction card reception slot 40 for at least partially receiving financial transaction card 22. In particular, financial transaction card 22 includes a magnetic strip 24 along one side of financial transaction card 22 including a magnetic representation of the information necessary to access the consumer financial account linked to or associated with financial transaction card 22. Accordingly, reception slot 40 extends along a side of financial transaction terminal 14 and includes a reading mechanism capable of accessing magnetic strip 24 to obtain necessary information from financial transaction card 22. Financial transaction terminal 14 is configured to selectively receive financial transaction card 22 as financial transaction card 22 is slid from a first end 42 of reception slot 40 to a second end 44 of reception slot 40. As financial transaction card 22 is slid from first end 42 to second end 44 of reception slot 40, the information on magnetic strip 24 is read by financial transaction terminal 14 and the associated financial account is electronically accessed based upon the information from the magnetic strip 24.

Alternatively, in one embodiment, financial transaction terminal 14 includes an alternative financial transaction card reception slot 46 instead of financial transaction card reception slot 40. Financial transaction card reception slot 46 is positioned at one end of financial transaction terminal 14 and is configured to receive financial transaction card 22 and to pull financial transaction card 22 fully within financial transaction terminal 14 for reading information from magnetic strip 24 of financial transaction card 22 to access the associated financial account.

Financial transaction terminal 14 additionally includes a user interface, monitor, or touch screen 48 on a top surface 45 of financial transaction terminal 14. Touch screen 48 is configured to relay information to the consumer or to the worker or associate of the retail establishment utilizing financial transaction terminal 14. In one embodiment, touch screen 48 also is configured to be contacted by stylus 16 to enter information into financial transaction terminal 14. In particular, financial transaction terminal 14 may exhibit buttons such as button 62 in FIG. 3 on touch screen 48 that can be pressed or otherwise selected with stylus 16. In one embodiment, stylus 16 is an elongated, pencil-like member including a pointed end configured to contact touch screen 48. In addition, touch screen 48 may display boxes for receiving written information or signatures. Touch screen 48 is capable of presenting different touch buttons and messages to a user throughout the transaction approval process.

Figure 2:
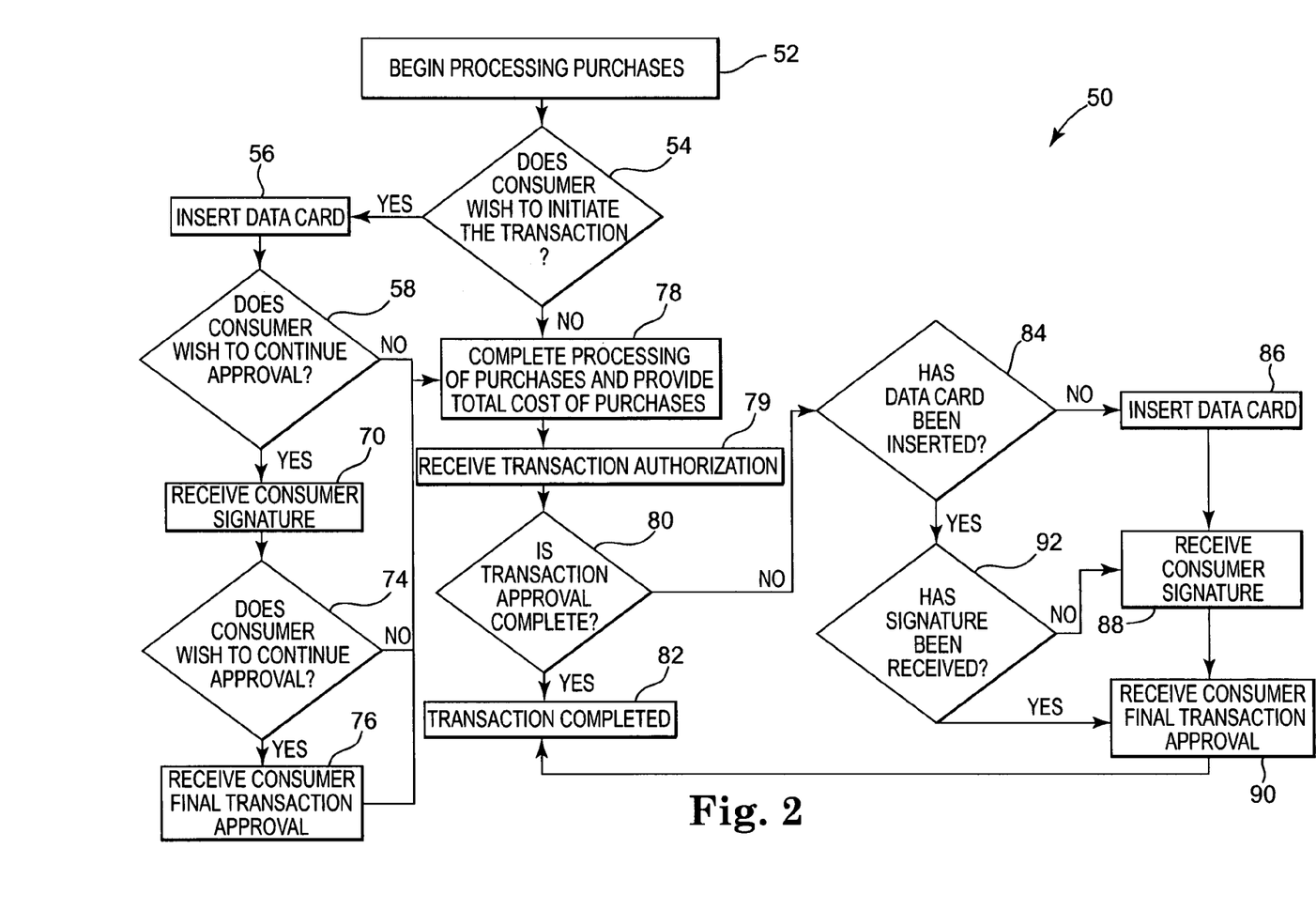
FIG. 2 is a flow chart illustrating one embodiment of a method of sale, according to the present invention.

One embodiment of a method of sale 50 is generally illustrated with reference to FIG. 2. At 52, the purchases to be sold to the consumer begin to be processed. In particular, in one embodiment, at 52, the product codes of the purchases are entered into point-of-sale terminal 12 by the worker of the retail establishment or the consumer via scanner 32, manually via keyboard 30, RFID device, or other entry device or system.

While purchases are being processed for sale at 52, touch screen 48 displays a message giving the consumer an option to initiate the financial transaction. In one embodiment, the message notifying the consumer that they may initiate the transaction is a message such as "PLEASE INSERT CARD" as illustrated in FIG. 1. If, at 54, the consumer decides to initiate the transaction, the consumer slides financial transaction card 22 through reception slot 40 or inserts financial transaction card 22 into reception slot 46 of financial transaction terminal 14 at 56. In one embodiment, only one financial transaction card reception slot 40 or 46 exists and, therefore, financial transaction card 22 must be inserted into or slide through the financial transaction card reception slot 40 or 46 existing in the particular financial transaction terminal 14 of transaction approval system 10.

Once the financial transaction card 22 is inserted, financial transaction terminal 14 interfaces with magnetic strip 24 to read information from magnetic strip 24. More specifically, financial transaction terminal 14 reads the information from magnetic strip 24 to remotely identify the financial institution or a financial network associated with the consumer financial account linked to financial transaction card 22. In one embodiment, transaction approval system 10 uses the information to determine the type of financial transaction card 22 that has been inserted, more specifically, whether the financial transaction card 22 is a debit card, a credit card, stored-value card, etc. Alternatively, upon insertion of financial transaction card 22, in one embodiment, transaction approval system 10 prompts the consumer to identify the type of financial transaction card 22 that has been inserted.

Figure 3:
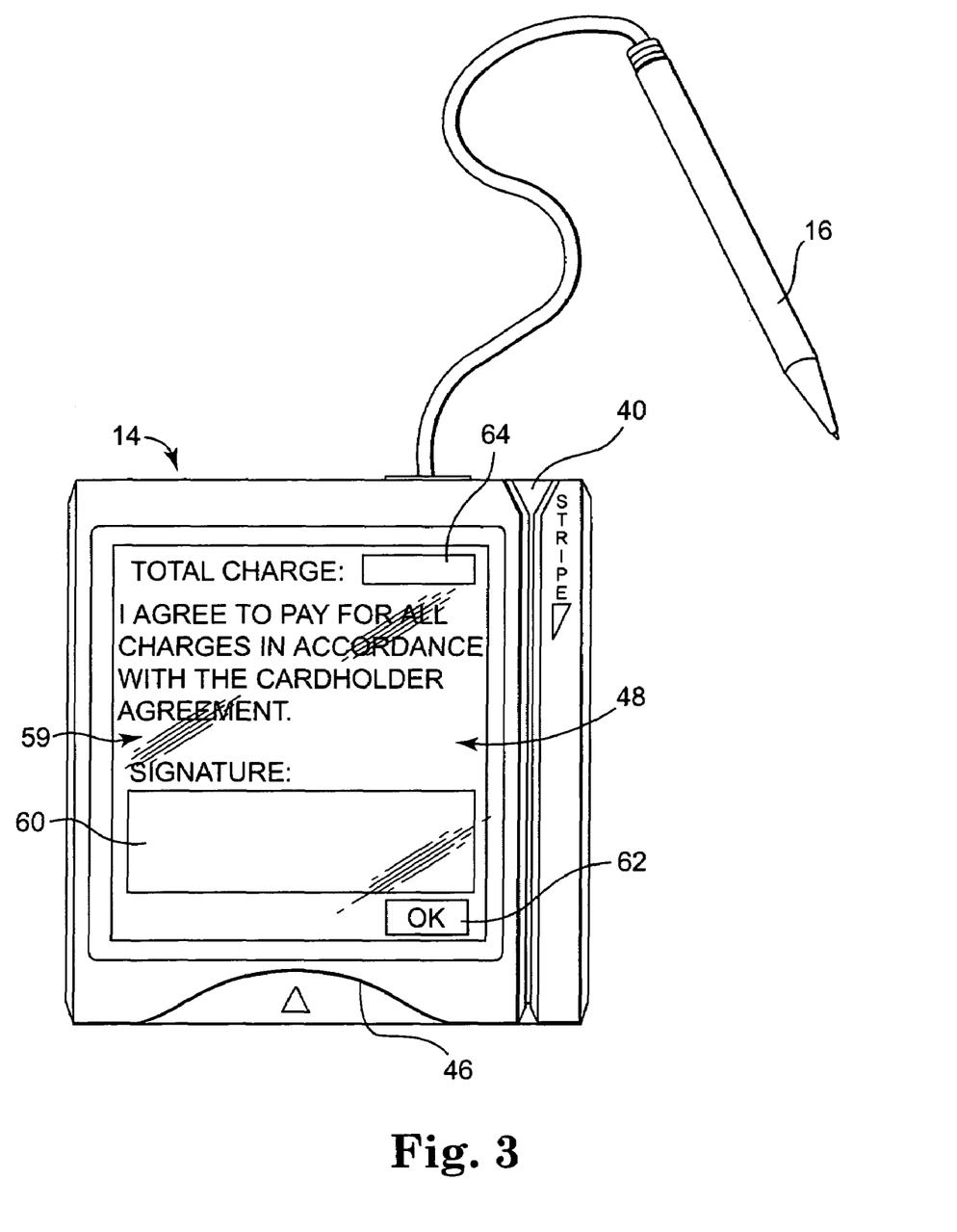
FIG. 3 is a top view illustrating a portion of the transaction approval system of FIG. 1 during the method of sale of FIG. 2.

Accordingly, following insertion of financial transaction card 22 into financial transaction terminal 14, at 58 the consumer decides whether he or she wishes to begin the transaction approval process. In particular, at 58, touch screen 48 presents the consumer with confirmation approval page or graphical interface 59 indicating that upon approval by the consumer, the consumer agrees to pay for all charges incurred in accordance with the cardholder agreement with the financial institution holding the financial account linked to financial transaction card 22, as illustrated in FIG. 3. In one embodiment, graphical interface 59 on touch screen 48 includes a signature block 60, for receiving a consumer signature, and/or a transaction confirmation button 62.

In one embodiment, graphical user interface 59 additionally includes a charge box 64 for indicating whether the total charges or cost of purchases have been determined and, if so, what the total charges are. At 58, charge box 64 is empty, indicating that the total charges for the purchases have not yet been determined (i.e. purchases are still being processed and a final, total charge has not yet been determined). In one embodiment, the empty charge box 64 is yellow or another bright color to draw consumer attention to the fact that the total charges are not yet determined. In one embodiment, once the total charges are computed, the color of charge box 64 is changed or removed. Alternatively, in one embodiment, charge box 64 remains a consistent color when empty and when displaying the total cost. Graphical interface 59 displayed by financial transaction terminal 14 as illustrated in FIG. 3 allows the consumer to determine whether or not they wish to continue approving the transaction at 58.

Figure 4:
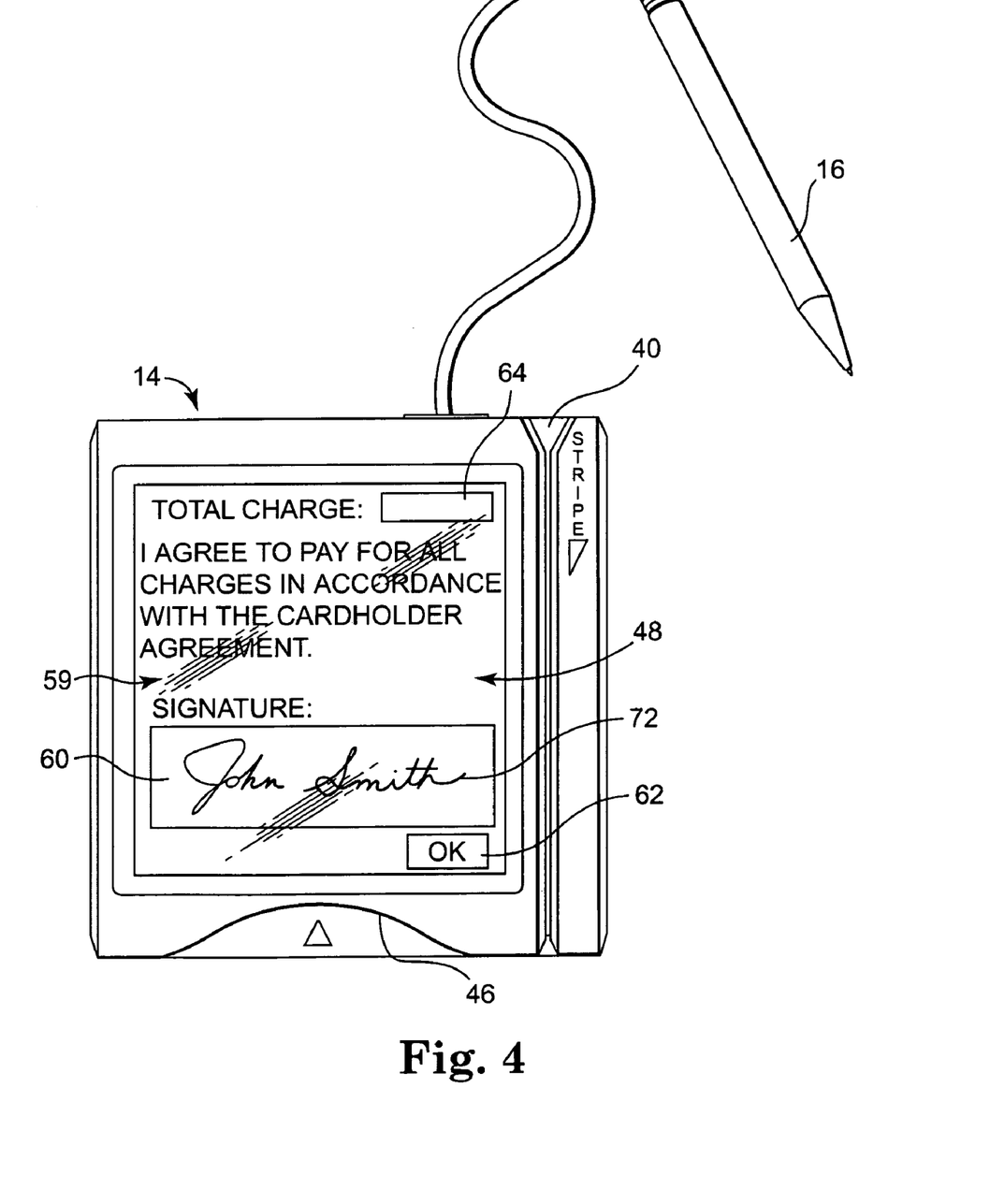
FIG. 4 is a top view illustrating a portion of the transaction approval system of FIG. 1 during the method of sale of FIG. 2.

More specifically, the objects displayed on touch screen 48 at this point allow the consumer to decide whether or not to provide a consumer signature within signature block 60 immediately or to wait until a subsequent time in the method of sale 50. In particular, if the consumer chooses to continue approving the transaction, then at 70 the consumer provides and transaction approval system 10 receives a signature 72 within signature block 60 as illustrated with reference to FIG. 4. If the consumer chooses not to continue approving the transaction at this time, the method 50 continues to 78 where processing of the purchases is completed, as will be further described below. Once signature 72 of the consumer is provided, the consumer determines whether or not they wish to finalize approval of the transaction at 74.

Figure 5:
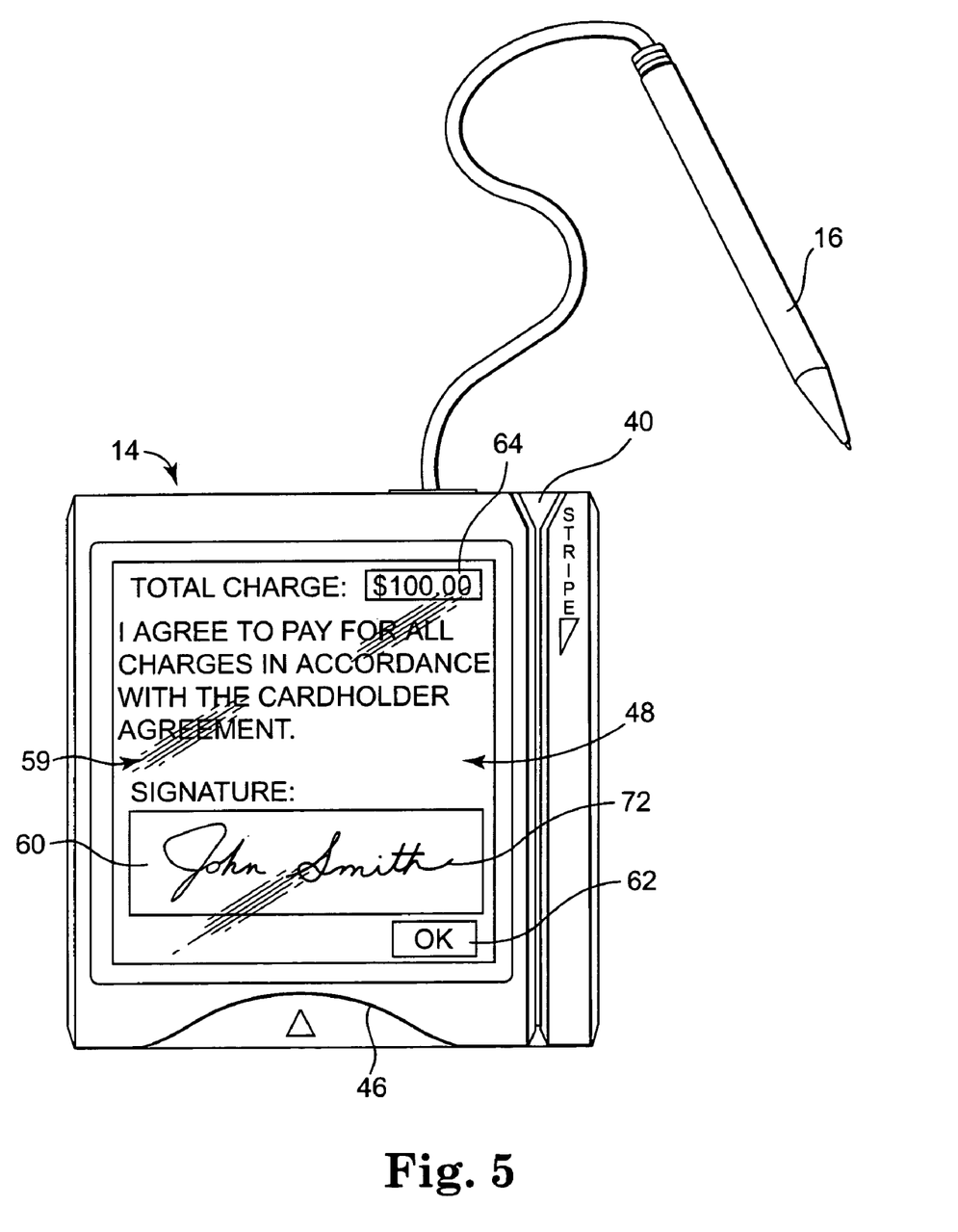
FIG. 5 is a top view illustrating a portion of the transaction approval system of FIG. 1 during the method of sale of FIG. 2.

If the consumer decides to continue the transaction approval process, then at 76 the consumer provides and the transaction approval system 10 receives final transaction approval or confirmation. If the consumer decides not to continue the transaction approval process, method 50 continues to 78 to complete processing of the purchases, as will be further described below. In one embodiment, the consumer provides final transaction approval by contacting confirmation button 62 of graphical user interface 59 with stylus 16. Contacting confirmation button 62 also signifies to financial transaction terminal 14 that the consumer has finished providing signature 72. At 78, following receipt of the final transaction approval, processing of the purchases is completed and the total cost of the processed goods is displayed in charge box 64 as illustrated in FIG. 5. In one embodiment, display box 64, once colored to indicate that total charges had not yet been determined, optionally changes or removes the color once the cost is displayed in box 64. In other embodiments, box 64 remains yellow or otherwise highlighted.

Following calculation of the total cost of purchases, the financial transaction terminal 14 uses the information from magnetic strip 24 of financial transaction card 22 to access the financial institution or network associated with the inserted financial transaction card 22 at 79. The financial institution or network provides the financial transaction terminal 14 with an indication of whether the financial account is sufficiently funded or authorized to support the current transaction. In particular, the financial institution or network provides an authorization to use the financial account or an indication that use of the financial account is declined. If the financial institution or network authorizes the current transaction the method of sale 50 continues.

At 80, data terminal 14 determines whether transaction approval is complete. If transaction approval is determined to be complete, then at 82 the transaction is completed by transferring funds, or at least an electronic representation of funds, or by authorizing such a transfer, from the consumer financial account linked to financial transaction card 22 to a financial account associated with the retail establishment. Upon conclusion of the financial transaction printed receipt 38 is created or finished and provided to the consumer detailing the purchases and the financial transaction. In one embodiment, printed receipt 38 includes a printed form of signature 72 digitally provided to financial transaction terminal 14. Upon completion of the financial transaction, the consumer is free to take the purchases from the retail establishment to their car or other desired location outside of or away from the retail setting.

Figure 6:
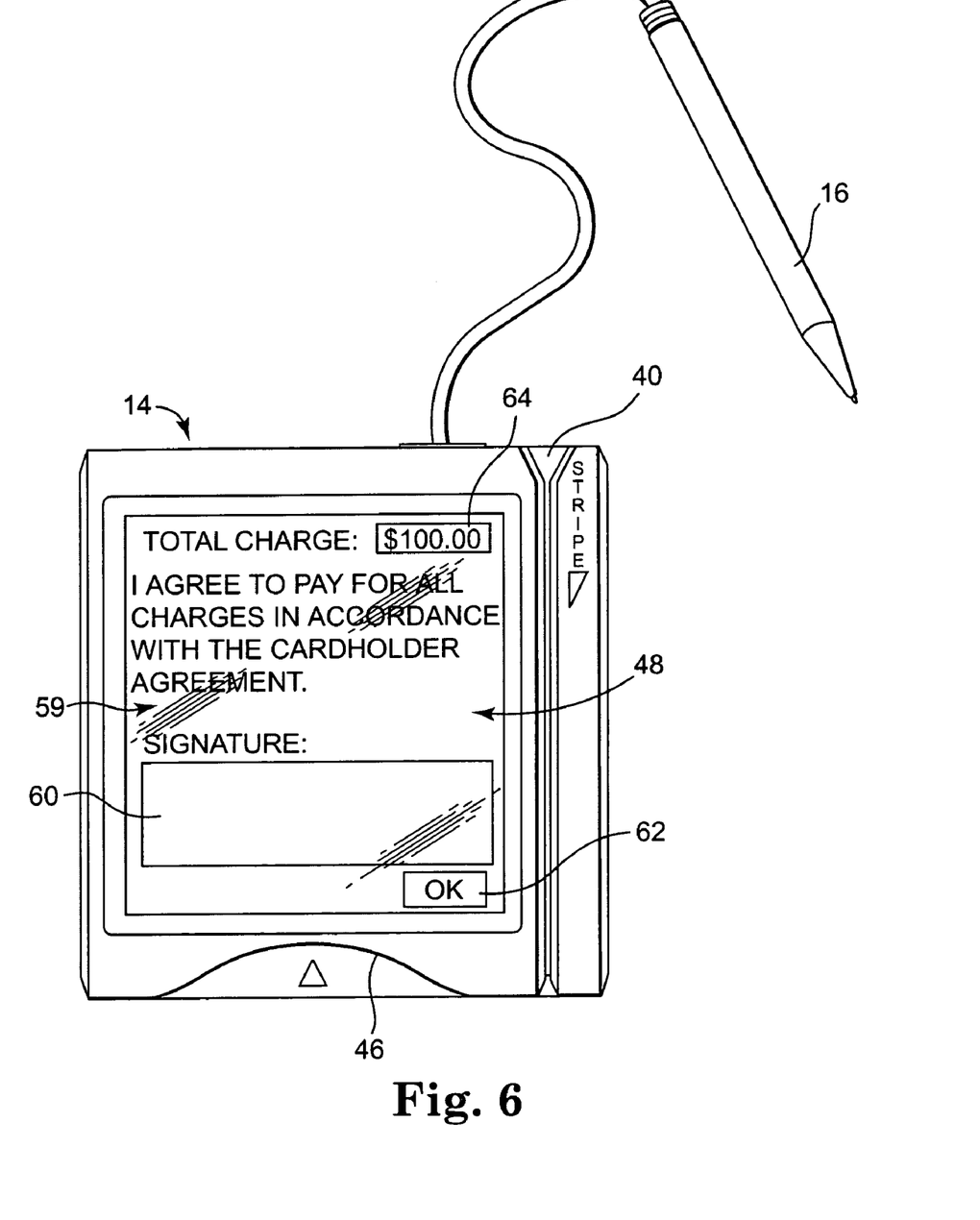
FIG. 6 is a top view illustrating a portion of the transaction approval system of FIG. 1 during the method of sale of FIG. 2.

If, at 54, the consumer decided not to begin the authorization process 50 or if at 58 or 74 the consumer decided not to continue the transaction approval process, the method of sale 50 continues directly to step 78 in which, as described above, processing of the purchases is completed and the total cost of the processed purchases is provided to the consumer, for example, by display of the cost within cost display box 64 as illustrated in FIG. 6. At 80, transaction approval system 10 determines if transaction approval is complete.

If, at 80, transaction approval system 10 determines that the transaction authorization is not complete (as it will if the consumer chose not to begin or finish the transaction or approval process at 54, 58, or 74), the method of sale 50 continues to 84. At 84, transaction approval system 10 determines whether financial transaction card 22 has or has not yet been inserted into financial transaction terminal 14 to initiate the transaction. If financial transaction card 22 has not yet been inserted into financial transaction terminal 14, transaction approval system 10 will continue to prompt the consumer to enter financial transaction card 22 into financial transaction terminal 14 via touch screen 48. At 86, a consumer eventually inserts financial transaction card 22 into financial transaction terminal 14.

As described above, upon insertion of financial transaction card 22, financial transaction terminal 14 interfaces with magnetic strip 24 to read the information from magnetic strip 24 to remotely identify the financial institution or at least a financial network associated with the financial account linked to financial transaction card 22. In one embodiment, transaction approval system 10 uses the information to determine the type of financial transaction card 22 that has been inserted, and more specifically, whether the financial transaction card 22 is a debit card, a credit card, a stored-value card, etc. Alternatively, upon insertion of financial transaction card 22, in one embodiment, transaction approval system 10 prompts the consumer to identify the type of financial transaction card 22 that has been inserted.

At 88, following insertion of financial transaction card 22 into card terminal 14, the consumer is prompted to provide consumer signature 72 via graphical interface 59 in a similar manner as described above with respect to receiving consumer signature 72 at 70. Following 88, in one embodiment, the consumer is presented with graphical interface 59 on touch screen 48, such as that illustrated in FIG. 5. At 90, the consumer provides and transaction approval system 10 receives final transaction approval, and the consumer acknowledges consumer signature 72 is complete by contacting touch screen 48, more particularly, by interaction with final approval button 62 via stylus 16. At 82, the funds are transferred or authorized to be transferred and receipt 38 is printed to complete the transaction. Once the transaction is complete, the consumer is free to leave the retail establishment with the purchases and receipt 38 in hand.

Alternatively, if at 84 it is determined that financial transaction card 22 has already been inserted into financial transaction terminal 14, transaction approval system 10 determines, at 92, whether consumer signature 72 has yet been received. If the consumer signature has not yet been provided, the method of sale 50 continues to 88 where consumer signature 72 is provided in signature box 60. Continuing once again to 90, final transaction approval is provided for receipt by transaction approval system 10 via consumer contact with approval button 62 via stylus 16, and the transaction is completed at 82 as described above.

If, at 92, transaction approval system 10 determines that a consumer signature 72 has already been received, the method of sale 50 continues directly to 90 where final transaction approval is provided by the consumer as described above. Once again, following final transaction approval, the transaction is completed at 82, and a consumer is provided with receipt 38, thereby leaving the consumer free to leave the retail establishment with the purchases and receipt 38 in hand.

A transaction approval system and method of sale, according to embodiments of the present invention, allow the consumer to decide when to start and finish consumer approval of a financial transaction. In particular, in order to speed the transaction process, a consumer can provide a signature and final transaction approval prior to the final processing of all the purchases. However, in other instances, a consumer may provide a signature while the purchases are being processed, but wait to provide final transaction approval until the total charges have been determined. In yet another instance, a consumer may wait until the total charge for the purchases is determined before providing a signature and a final transaction approval.

Although the invention has been described with respect to particular embodiments, such embodiments are for illustrative purposes only and should not be considered to limit the invention. Various alternatives and changes will be apparent to those of ordinary skill in the art. For example, other display screens or buttons may be presented to a consumer in order to provide the consumer with a two or three point transaction approval process that can be entered into at a time chosen by the consumer. In addition, one or more retail employees can prompt the consumer to complete one or more tasks in the process. Additional modifications and changes will be apparent to those of ordinary skill in the art.

What is claimed is:

1. A method of performing a retail transaction, the method comprising steps performed in the following order:
   determining a total cost of at least one purchase to be made by a consumer in the retail transaction;
   offering the consumer a first option to provide an endorsement and a final approval of the retail transaction prior to determining the total cost of the at least one purchase, to decrease the time the consumer spends in a checkout line of a retail establishment;

offering the consumer a second option to provide the endorsement and the final approval of the retail transaction after determining the total cost of the at least one purchase;

receiving the endorsement from the consumer; and receiving the final approval from the consumer;

wherein the consumer is free to take the at least one purchase away from the retail establishment only following offering the consumer the first option, offering the consumer the second option, receipt of the endorsement and receipt of the final approval from the consumer in completion of the financial transaction.

2. The method of claim 1, further comprising:

offering the consumer a third option to provide the endorsement prior to determining the total cost of the at least one purchase and to provide the final approval after determining the total cost of the at least one purchase.

3. The method of claim 1, further comprising:

providing a consumer interface for displaying information to the consumer, wherein providing the consumer interface includes providing a cost display box for displaying the total cost after the total cost has been determined.

4. The method of claim 3, wherein providing the consumer interface includes highlighting the cost display box before the total cost is determined.

5. The method of claim 4, wherein providing the consumer interface includes removing any highlighting of the cost display box after the total cost is determined.

6. The method of claim 1, wherein receiving the endorsement from the consumer is completed via a digital signature box.

7. The method of claim 1, wherein offering the consumer the first option and offering the consumer the second option each occur at the checkout line.

8. The method of claim 7, wherein receiving the endorsement and receiving the final approval each occur at the checkout line.

9. The method of claim 1, further comprising:

identifying a consumer financial account held by a financial institution;

receiving authorization from the financial institution to enable payment for the at least one purchase from the consumer financial account; and wherein the endorsement, the final approval, and the authorization collectively permit the total cost to be debited from the consumer financial account to pay for the at least one purchase.

10. The method of claim 9, wherein identifying a consumer financial account includes supplying a financial transaction card including a magnetic strip storing information identifying the consumer financial account.

11. The method of claim 10, wherein the financial transaction card is one of a debit card and a credit card.

12. The method of claim 1, wherein determining the total cost includes processing the at least one purchase with a processor at a point of sale.

13. The method of claim 12, wherein processing the at least one purchase includes recording a name and a price of each of the at least one purchase.

14. The method of claim 12, wherein receiving the endorsement occurs during processing of the at least one purchase.

15. The method of claim 1, wherein receiving the endorsement includes receiving a confirmation signature from the consumer.

16. The method of claim 15, wherein receiving the confirmation signature includes generating a digital representation of the confirmation signature.

17. The method of claim 1, wherein receiving the final approval occurs after receiving the endorsement.

18. The method of claim 1, wherein determining the total cost includes processing the at least one purchase with a processor at a point of sale, and receiving the final approval occurs during processing of the at least one purchase.

* * * * *